Figure 1:
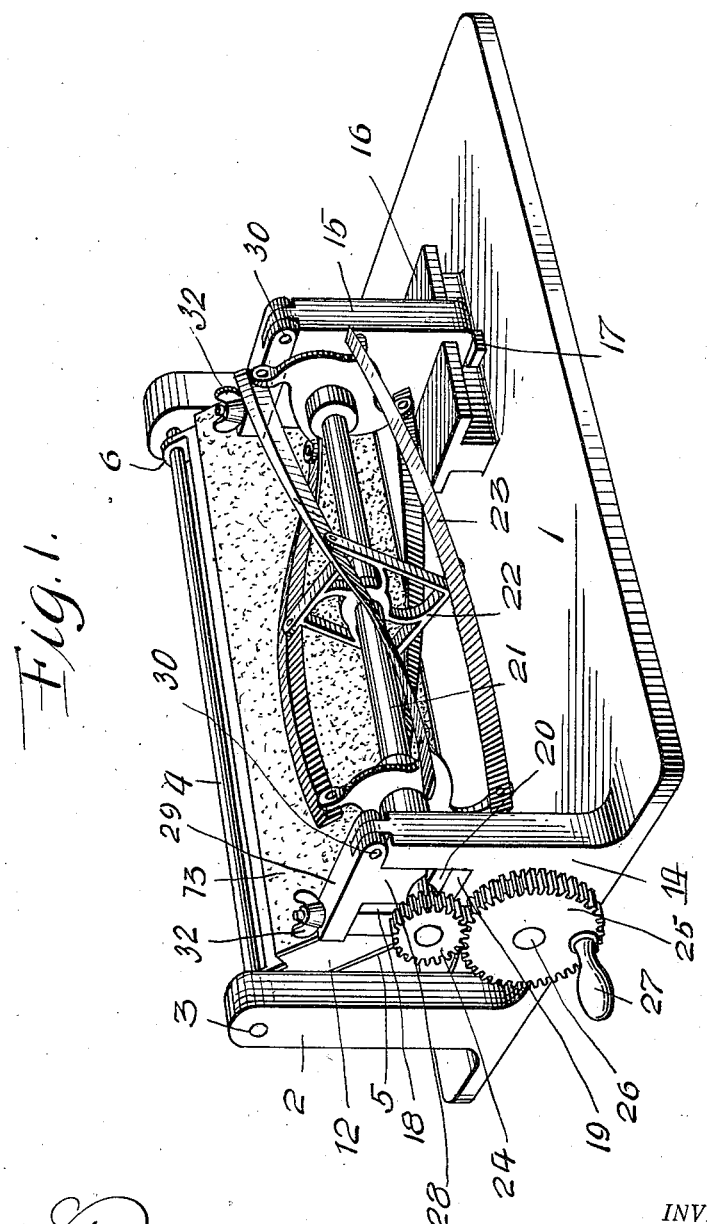

F. MUHL.
LAWN MOWER SHARPENER.
APPLICATION FILED JULY 3, 1911.

1,004,894.

Patented Oct. 3, 1911.

2 SHEETS—SHEET 1.

WITNESSES:
Samuel Payne
R. H. Butler

INVENTOR.
F. Muhl.
BY
ATTORNEYS.

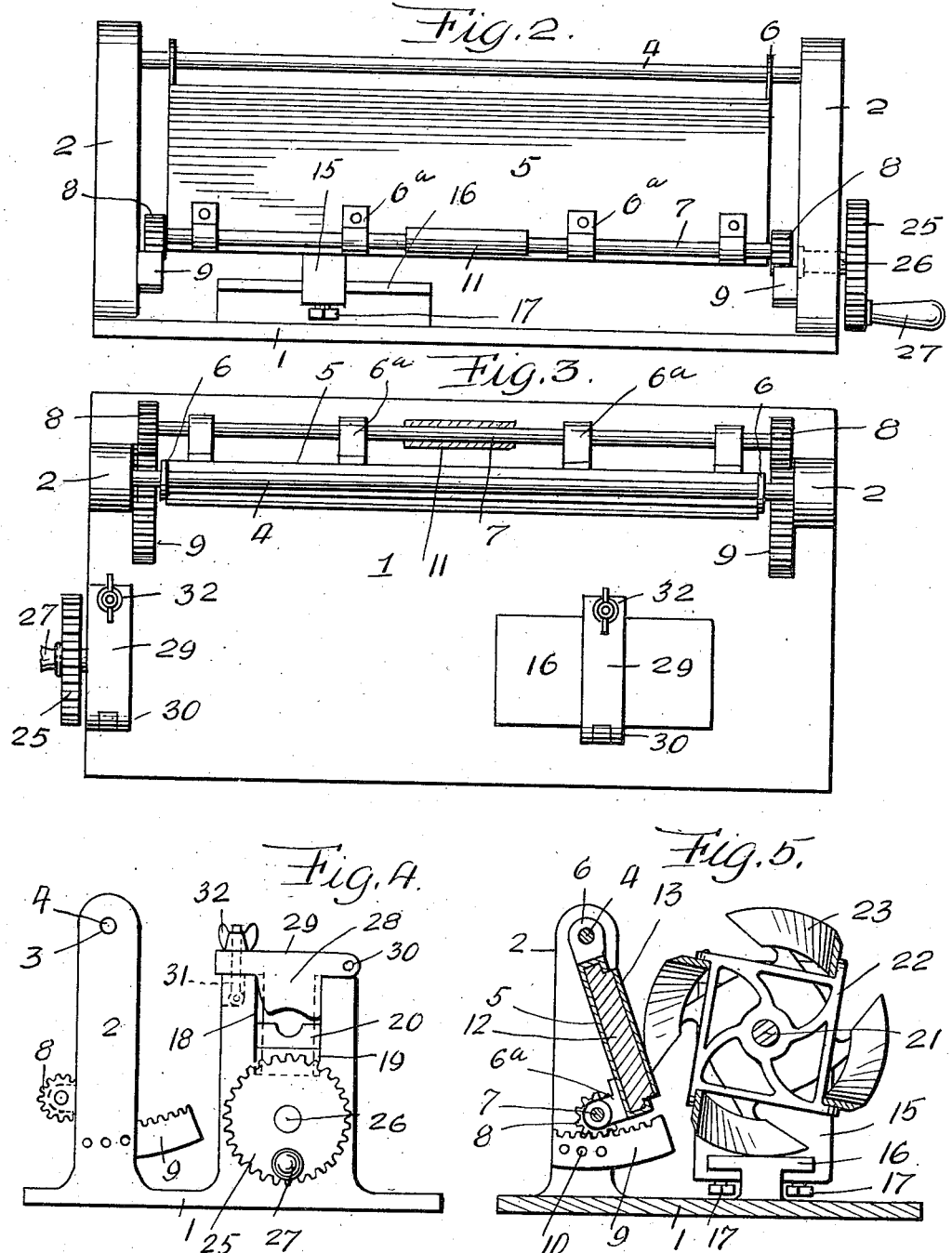

UNITED STATES PATENT OFFICE.

FERDINAND MUHL, OF PITTSBURGH, PENNSYLVANIA.

LAWN-MOWER SHARPENER.

1,004,894.　　　　Specification of Letters Patent.　　Patented Oct. 3, 1911.

Application filed July 3, 1911. Serial No. 636,672.

*To all whom it may concern:*

Be it known that I, FERDINAND MUHL, a citizen of the United States of America, residing at Pittsburgh, in the county of Allegheny and State of Pennsylvania, have invented certain new and useful Improvements in Lawn-Mower Sharpeners, of which the following is a specification, reference being had therein to the accompanying drawing.

This invention relates to a lawn mower sharpener, and the object of my invention is the provision of positive and reliable means, in a manner as will be hereinafter set forth, for expeditiously sharpening the blades of a mower.

My invention aims to provide a sharpening device in which the rotary cutter of a lawn mower can be placed and the blades thereof evenly ground and sharpened without injuring the blades. The sharpening device has adjustments whereby rotary cutters of various lengths and diameters can be placed in the device and operated upon. One of these adjustments is a holder for sharpening material, and the material can be easily removed when worn, and renewed. Another adjustment is a housing that is shiftable relatively to a fixed housing; consequently, rotary cutters of various lengths can be held in the device.

The invention will be hereinafter specifically described and then claimed.

Reference will now be had to the drawings, wherein like numerals denote corresponding parts throughout the several views, in which:—

Figure 1 is a perspective of the sharpening device; Fig. 2 is a rear elevation of the same; Fig. 3 is a plan of the device; Fig. 4 is an end view of the same, and Fig. 5 is a cross sectional view of the device.

The reference numeral 1 denotes a base plate, and carried by said plate adjacent to the rear edge thereof and at each end is an upright 2, said uprights having the upper ends thereof apertured, as at 3 for a longitudinal rod 4.

5 denotes a channel-shaped holder, having the upper edge thereof, at the ends, provided with apertured ears 6 adapted to receive the rod 4 and pivotally support the holder 5. The lower edge of the holder is provided with rearwardly extending bearings 6ª, and journaled in these bearings is a longitudinal shaft 7, having the ends thereof provided with pinions 8 meshing with curved racks 9 secured, as at 10, to the inner sides of the uprights 2. The shaft 7, intermediate the ends thereof, has a loose sleeve 11 serving functionally as a handle for gripping said shaft.

12 denotes a block detachably mounted in the holder 5, and the face of this block is provided with a sharpening material 13, as an emery cloth. In lieu of the block 12 and the material 13, an ordinary whet-stone can be properly shaped and placed in the holder. To remove the block 12, the rod 4 is removed from the uprights, and then the holder in its entirety can be removed from the device. The base plate 1 is provided at one end thereof with a stationary housing 14, and adjacent to the opposite end thereof with an adjustable housing 15. The adjustable housing 15 is slidably mounted upon the longitudinal T-shaped bearing 16, said housing being held in engagement therewith by a set screw 17. The upper ends of the housings 14 and 15 are provided with openings 18, and arranged in said openings are filler blocks 19 and bearing blocks 20. The bearing blocks 20 are adapted to revolubly support the ends of a rotary cutter shaft 21, said shaft having spiders 22 supporting blades 23. The rotary cutter is of the ordinary and well known type common to various types of mowers, and the end of the shaft has a small gear wheel 24. This gear wheel is adapted to mesh with a large gear wheel 25, revolubly mounted upon a stub shaft 26 carried by the stationary housing 14. The large gear wheel 25 has a crank or handle 27.

The ends of the shaft 21 are retained upon the bearing blocks 28 carried by gates 29. These gates are pivotally connected to the housings 14 and 15, as at 30, and each gate is retained in a closed position by a pivoted bolt 31 and a winged thumb nut 32. The bolts 31 are pivotally connected to the housings and are adapted to be swung upwardly into the bifurcated ends of the gates.

Through the medium of the filler blocks 19 the shaft 21 can be correctly positioned within the housings, and rotary cutters of various diameters can be accommodated. By reason of the adjustable housings 15 it is evident that rotary cutters of various lengths can be revolubly held within the device.

When the large gear wheel 25 is revolved by one hand, the sharpening material is shifted into position with the other hand, whereby the cutting edges of the blades 23 will engage the sharpening material 13 and be ground until sharpened. By pivotally connecting the holder 5 to the rod 4, said holder can be swung inwardly and outwardly to engage the entire longitudinal edge of a blade, it being a well known fact that the majority of blades are arranged upon a compound curve, as shown in Fig. 1. The pinions 8 insure an even and steady movement of the holder, consequently very little skill is required to properly sharpen the blades of the rotary cutter.

The device, with the exception of the sharpening block, is made of light durable metal, and while in the drawing there is illustrated a preferred embodiment of the invention, it is to be understood that the structural elements are susceptible to such modification as fall within the scope of the appended claims.

What I claim is:—

1. A lawn mower sharpener comprising a base, a fixed housing and an adjustable housing carried thereby, said housings adapted to receive the shaft of a rotary cutter therein, gates carried by the housings for securing said shaft in position, a rod connecting said housings, and a holder hung on said rod to swing toward and away from the rotary cutter, said holder having means for securing an abrading material therein.

2. A lawn mower sharpener comprising housings adapted to detachably and revolubly hold a rotary cutter, a holder for sharpening material pivotally mounted adjacent said housings and adapted to be swung into position to engage the blades of the rotary cutter, and means adapted to insure an even and steady movement of said holder.

3. A lawn mower sharpener comprising a stationary housing, an adjustable housing, means carried by said housings and adapted to retain a rotary cutter therein, and a holder for sharpening material pivotally mounted adjacent to said housing and adapted to be swung into engagement with the cutting blades of the rotary cutter.

4. A lawn mower sharpener comprising a stationary housing, an adjustable housing, means carried by said housings and adapted to retain a rotary cutter therein, a holder for sharpening material pivotally mounted adjacent to said housing and adapted to be swung into engagement with the cutting blades of the rotary cutter, means adapted to insure an even and steady movement of said wheel, and means carried by said stationary housing and adapted to facilitate the revolving of the rotary cutter held by said housings.

5. A lawn mower sharpener comprising housings adapted to support a rotary cutter, uprights, a holder for sharpening material pivotally supported by said uprights and adapted to be swung to engage the blades of a rotary cutter, means carried by said uprights adapted to insure an even and steady movement of said holder, and means carried by one of said housings and adapted to facilitate the revolving of a rotary cutter.

6. A lawn mower sharpener comprising a base plate, a stationary housing carried thereby, an adjustable housing carried by said base plate, means adapted to revolubly retain a rotary cutter in said housings, a holder pivotally supported by said base plate, sharpening material detachably held by said holder, means carried by said holder and adapted to facilitate an even and steady movement thereof, and means carried by said stationary housing and adapted to facilitate the revolving of the rotary cutter held by said housings.

7. In a lawn mower sharpener, a supporting base, a stationary and an adjustable housing carried by said base, said housings adapted to receive a lawn mower knife therein, means for securing said knife in the housings, and a holder pivotally mounted to swing toward and away from the knife, said holder carrying abrading material to engage the knife.

In testimony whereof I affix my signature in the presence of two witnesses.

FERDINAND MUHL.

Witnesses:
 H. C. EVERT,
 MAX H. SROLOVITZ.

Copies of this patent may be obtained for five cents each, by addressing the "Commissioner of Patents, Washington, D. C."